Figure 1:
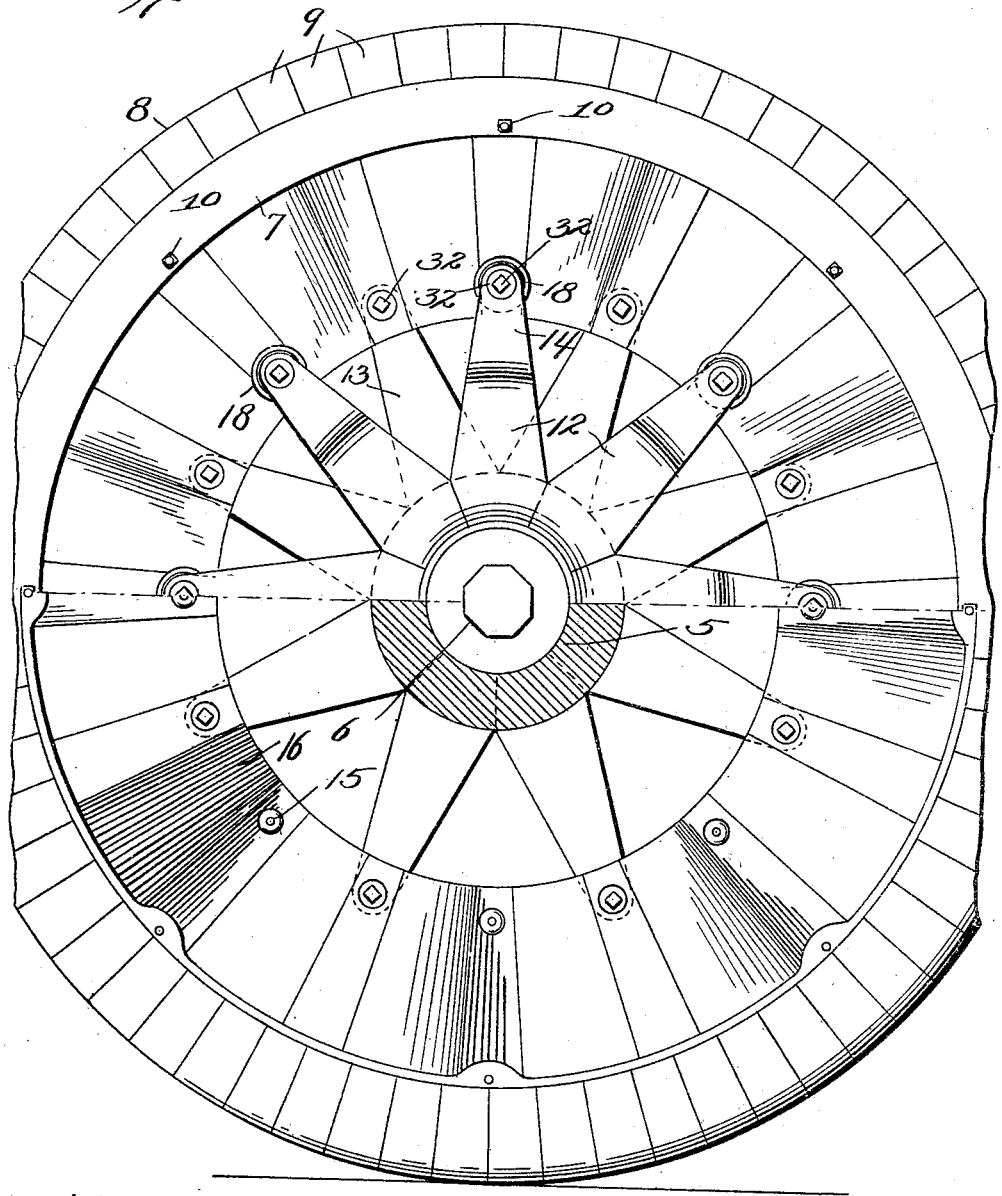

W. N. ALLAN.
VEHICLE WHEEL.
APPLICATION FILED NOV. 13, 1915.

1,203,451.

Patented Oct. 31, 1916.
2 SHEETS—SHEET 1.

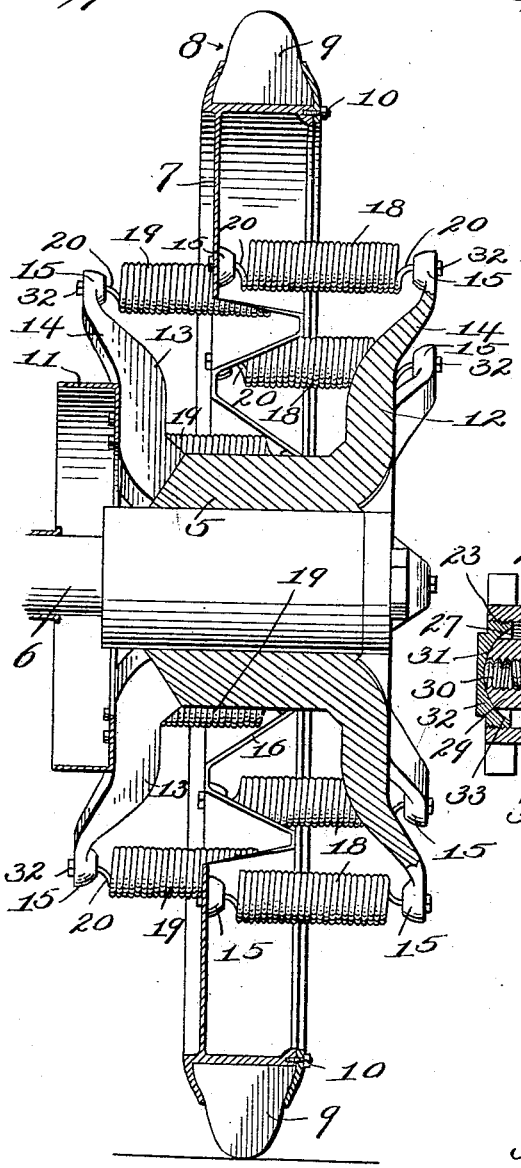

UNITED STATES PATENT OFFICE.

WILLIAM NELSON ALLAN, OF SAN ANTONIO, TEXAS.

VEHICLE-WHEEL.

1,203,451.  Specification of Letters Patent.  Patented Oct. 31, 1916.

Application filed November 13, 1915. Serial No. 61,380.

*To all whom it may concern:*

Be it known that I, WILLIAM N. ALLAN, a citizen of the United States, residing at San Antonio, in the county of Bexar and State of Texas, have invented new and useful Improvements in Vehicle-Wheels, of which the following is a specification.

This invention relates to wheels of the floating rim type and capable of use for all kinds of vehicles, but more particularly applicable to motor vehicles.

The main object of the invention is to provide a wheel having a spring organization interposed between the hub and tire or rim thereof in such manner that each spring carries an equal part of the load, both as to actual weight and driving stress or strain thereon, and also permit a comparatively greater travel of the tire or rim relatively to a minimized expansion of the springs.

A further object of the invention is to so arrange and place springs between the hub and tire or rim of a wheel as to effect a multiplied resilience at the tire or rim relatively to that given out by the springs.

A further object of the invention is to dispose and place springs between the hub and tire or rim of a wheel in such manner as to permit the springs to work freely in any direction to the extent of from approximately thirty-five to forty-five degrees.

A still further object of the invention is to generally improve wheels of the floating rim type and to so organize the components thereof, including a series of springs interposed between the hub and tire or rim, that the wheel will have a sensitive resilient operation and strong shock absorbing characteristics.

With these and other objects and advantages in view the invention consists in the preferred construction and arrangement of parts hereinafter more fully described and subject to such variations in dimensions, proportions and details of organization as are contemplated by the scope of the invention.

In the accompanying drawings one embodiment of the invention is illustrated for the purpose of practical demonstration of the principles of operation of the improved structure, but the invention is not to be understood as being limited to the precise features as shown.

In the drawings: Figure 1 is a sectional elevation, partially broken away, of a wheel embodying the invention. Fig. 2 is a central transverse vertical section of the wheel. Fig. 3 is a detail enlarged sectional elevation of portions of the wheel particularly illustrating the arrangement and manner of attaching the springs to the hub and tire or rim.

The numeral 5 designates the hub fitted to the axle 6 preferably by the usual form of roller bearings, not shown, said axle in the present instance being intended to represent a driving axle. A rim 7 surrounds the hub and is provided in the present instance with a tire 8 composed of small sections 9 of wood of suitable hardness, cut lengthwise of the grain and glued together and then turned or otherwise constructed to desired size and shape and secured to the rim in the usual manner by bolts 10. The usual form of brake drum 11 is bolted or otherwise secured to the hub 5.

The hub 5 is formed with a plurality of forks 12 and 13 at opposite sides thereof and in staggered relation, that is, the forks 12 stand opposite the spaces between the forks 13, and vice versa. Both sets of forks extend outwardly with a slight flare, as at 14, and terminate in sockets or seats 15 which stand outwardly beyond the sides of the hub to give ample space or distance between the terminals of the forks for a purpose which will be presently explained. The rim 7 extends inwardly toward the hub a sufficient distance to permit the terminals of the forks to stand in line with the said rim adjacent to the inner terminal thereof, as shown by Fig. 1, and this rim is shaped as shown in detail by Fig. 3 and formed with truncated angular corrugations or depressions 16 which regularly alternate so that the reduced portion or truncation 17 of one corrugation or depression occupies a position in an outward direction at one side of the wheel and the truncation of the next corrugation or depression occupies an outward position at the opposite side of the wheel, and by this means the openings or inlets to the several corrugations or depressions are successively in reverse positions at opposite sides of the wheel. The terminals of one set of forks, as for instance the forks 12, are centrally disposed with relation to the openings of alternate corrugations or depressions 16, and the opposite set of forks, as 13, is similarly disposed relatively to the openings of the remaining alternate corrugations. Connected to the centers of the opposing terminals of the forks 12 and 13 and the alternate reversely positioned truncations 17 of the corrugations or depressions 16 are springs 18 and 19, these springs projecting inwardly into the wheel in transverse directions and in a horizontal plane, all of the springs being similar as to their length and tension as nearly as can be structurally accomplished. In other words, the springs are all of the same diameter and length, and in the present instance sixteen springs are used, but the number of springs as well as their size and length will be determined by the load to be carried and the resilience desired. The springs are each connected at their opposite terminals 20 respectively to the sockets 15 of the forks 12 and 13 and the truncations 17 of the corrugations or depressions 16 of the rim 7 by half ball and socket joints, as clearly shown by Fig. 3. Each terminal 15 of the several forks is formed with a socket 21 having a converging convex wall 22 toward the inner side of the fork to provide a reduced opening at the inner part of socket, and the outer portion of each socket wall is screw-threaded, as at 23. The joint includes a segmental ball member 24 provided with a screw-threaded opening 25 to receive the screw-threads 26 on the spring terminal 20, the said segmental ball member 24 being provided with a plurality of openings or recesses 27 to receive a wrench and also with a series of openings 28 in the opposite side for engagement with a suitable tool to hold the segmental ball member in place while tightening up the parts of the joint. A lock nut 29 having a screw-threaded bore 30 is also included in the joint organization and is formed with a suitable outer polygonal surface for engagement of a wrench therewith and is also constructed with a convex terminal 31. Fitted in the socket 21 and engaging the screw-threads 23 is a grease cup cap 32 having an inner concave or spherical shaped recess or seat 33 with which the convex end 31 of the lock nut 29 has contact. The lock nut 29 serves to hold the segmental member 24 in proper adjusted position relatively to the screw-threaded terminal 20 of the spring, and around said nut is ample space, as at 34, to receive grease or other lubricant for rendering the movable parts of the joint noiseless in their operation.

When the lock nut 29 is applied over the screw-threaded terminal 20 of the spring, the segmental member 24 is held by a suitable spanner or tool in fixed position by engagement of said tool with the openings 28. The grease cup cap will also be formed with a suitable wrench engaging surface or projection as in the usual construction of this class of devices. The joint for the terminal of the spring which is located in the truncation of each corrugation or depression 16 is of precisely the same structure as that just described in connection with the joint at the terminal of each fork 12 or 13 of the hub and the same reference characters have been applied to corresponding parts. The only difference in the arrangement of the joints in the truncations 17 and the terminals of the forks is that the reduced portion of the socket 21 or the converging curved wall 22 is at the side of the truncation opposite that of the fork so that both segmental members 24 will stand opposite to each other in the alined joints of the fork terminals and the truncations.

As hereinbefore described, all of the springs 18 and 19 extend transversely over or are parallel with the axle 6 so that when the load is applied each spring is forced off this parallel line independently of direction, and each will carry an equal amount of the load, the springs at the same time permitting approximately three-and-one-half inches of travel in the tire or rim to one inch expansion of the springs. Moreover, the driving stress of the vehicle will be carried equally by all the springs. The side stress, however, is carried by only about seven of the springs, but it will be seen that the springs on the opposite side from which the stress is applied after contraction will act as a brace between the joints and the resistance will be set up by the grease cup caps 32 through the lock nuts 29 and the segmental ball members 24. This side stress, however, will only occur in extreme cases, as for instance when suddenly turning a corner at high speed or on a very acute or pronounced angle of the roadway. Under all conditions it will be seen that the springs will work freely at very pronounced angles of the tire or rim, the springs being free to assume angular positions when required to compensate for variations in the road surface over which the wheel moves. The springs are free in their work or operation in any direction to the extent of about thirty-five to forty-five degrees. Another advantage of the springs as disposed in the wheel is that the tire or rim will have a multiplied resilience relatively to that given out by the individual springs. The joints or the segmental ball member and socket connections for the terminals of the springs provide for ready adjustment within each joint particularly in view of the arrangement of the grease cup caps and the lock nuts, and, furthermore, these joints permit a pushing and pulling strain in accordance with the operation of the several springs under various conditions.

It will be understood that if found necessary at any time any one or more of the springs may be readily replaced without dismantling the entire wheel, and, moreover, the tension of the springs may be uniformly maintained through the joints with which the terminals thereof engage.

Another advantage of the improved wheel is the wood tire which operates to deaden the sound and always gives a clean surface, and, above all, is comparatively inexpensive. Wood of any kind found best adapted for the construction of the tire will be adopted, and while it is preferred to use a wood tire it will be understood that the wheel might be equipped with any other form of tire.

What is claimed is:

1. In a wheel of the class specified, a hub having outwardly projecting attaching members arranged in alternate relation on opposite sides thereof whereby the members at one side will be opposite the spaces between the members at the opposite side, a floating rim surrounding the hub and of materially greater diameter than the latter, the said rim being formed with alternately arranged truncated angular depressions uniformly disposed on opposite sides of the central vertical diameter of the hub, the depressions having inner open portions arranged opposite the projecting members of the hub, and a plurality of springs disposed parallel to the axis of the hub and alternately connected at their opposite ends respectively to the projecting members of the hub and the outer closed portions of the depressions in the rim whereby the inner ends of the springs extend beyond the plane of the central vertical diameter of the hub in reverse directions in alternation and outwardly beyond the opposite sides of the rim to permit and compensate for lateral play of the rim relatively to the hub and to set up a resilient supporting means for the rim and which is disposed between the rim and the hub.

2. A wheel of the class specified having a hub and a floating rim around the same, the hub being of integral structure and projecting in an outward direction equally upon opposite sides of the wheel and the rim and having attaching means arranged in alternate relation with respect to the opposite sides of the hub and disposed outside of opposite sides of the rim, and a plurality of springs arranged parallel to the axis of the hub and extending inwardly alternately from opposite side portions of the hub and secured to opposing side portions of the rim in alternation, the inner ends of the springs projecting past the plane of the central vertical diameter of the hub, and the inner end of each spring shielded and separated from the adjacent springs by portions of the rim.

3. In a wheel of the class specified, a hub having a plurality of projecting arms integrally formed therewith and extending outwardly and flared therefrom in a radial direction relatively to opposite ends of the hub, the arms at one side of the hub being disposed opposite the spaces between the arms at the opposite sides of the hub and the space between the opposing arms of the hubs being clear, a rim surrounding the hub and provided with depressions disposed in outward relation with opposite sides of the wheel and formed with outer closed sides and inner open portions, the depressions of the rim being arranged in alternation and the open portions thereof reversely disposed to alternately aline with the ends of the arms of the hub, and a plurality of springs interposed between the hub and the rim and holding the hub resiliently suspended within the rim, the springs being parallel to the axis of the hub and movably secured at their opposite ends respectively and in alternation to the opposite arms and reversely arranged depressions of the rim and having their inner extremities extending inwardly past the plane of the central vertical diameter of the hub and rim, the springs being shielded and separated from each other by the walls of the depressions in the rim.

4. In a wheel of the class specified, a hub having a plurality of forks integrally formed at opposite ends thereof and radially projecting therefrom and flaring outwardly, the forks at one end of the hub standing opposite the spaces between the forks at the opposite end of the hub, a rim surrounding the hub at a distance from the latter and having partially inclosed means arranged in alternation at opposite sides with the open portions of said means disposed inwardly and in alinement with the respective forks at the opposite ends of the hub, the hub extending at opposite ends materially beyond the opposite sides of the wheel and rim, and springs arranged parallel with the axis of the hub and interposed between and movably connected to the ends of the forks and the outer portions of the inclosing means of the rim, the inner ends of the springs extending alternately in opposite directions beyond the vertical center of the wheel rim and hub and separated from each other by the inclosing means of the rim into which the said ends of the springs project, either the hub or the rim being free to assume an angular position one with relation to another in an inward or outward direction and the springs constituting the sole connecting means between the forks of the hub and the opposite side portions of the rim.

In testimony whereof I have hereunto set my hand in presence of two subscribing witnesses.

WILLIAM NELSON ALLAN.

Witnesses:
C. H. SURKAMP,
W. H. KILLINGSWORTH.